Aug. 15, 1933.   C. A. SCHALLIS   1,922,782
INFUSION DEVICE AND THE LIKE
Filed Aug. 5, 1930   2 Sheets-Sheet 1
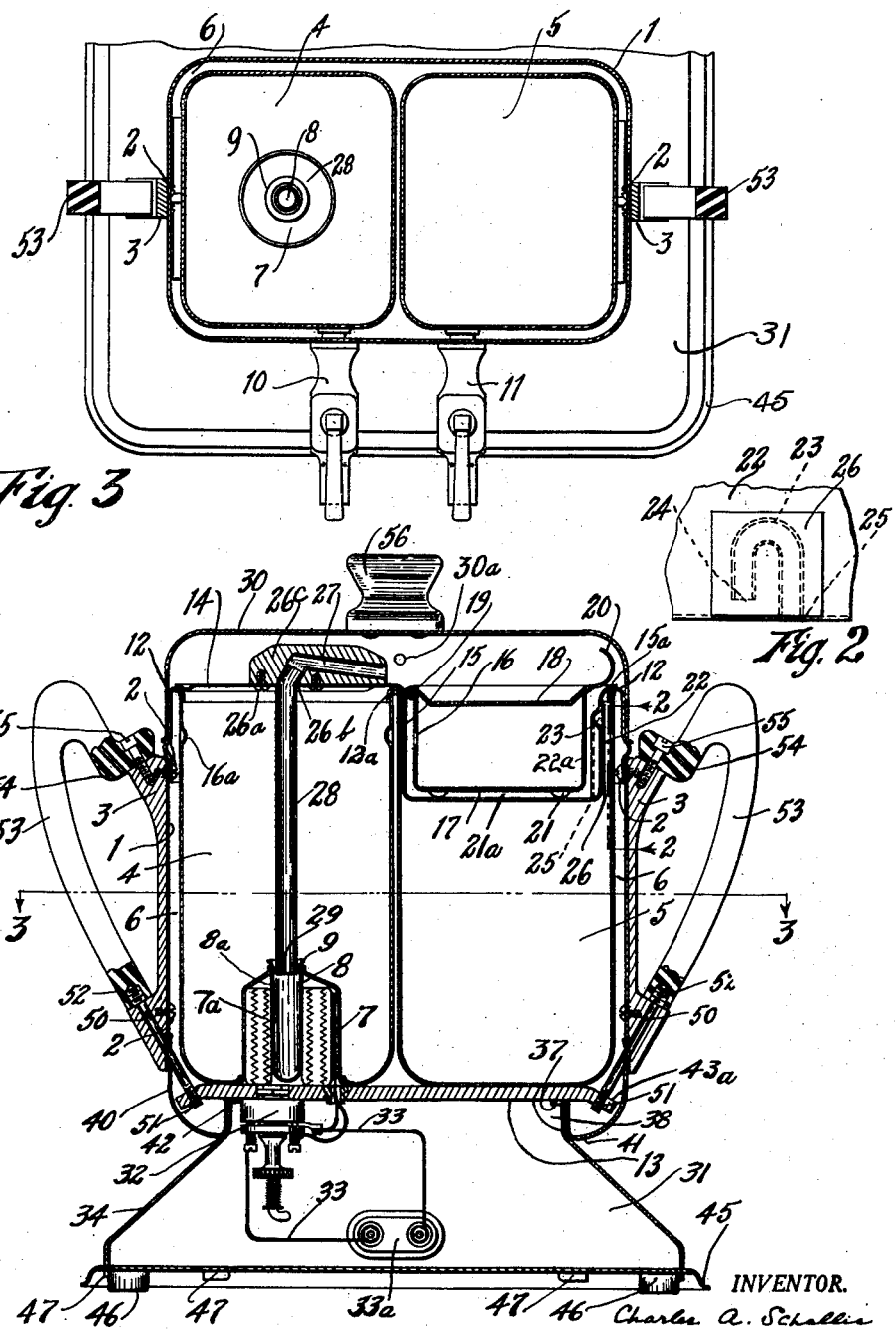
INVENTOR.
Charles A. Schallis
BY
Henry Lanahan
ATTORNEY Patented Aug. 15, 1933

1,922,782

UNITED STATES PATENT OFFICE 1,922,782

INFUSION DEVICE AND THE LIKE

Charles A. Schallis, Ernestville, N. J., assignor to Thomas A. Edison, Incorporated, West Orange, N. J., a Corporation of New Jersey Application August 5, 1930. Serial No. 473,223

22 Claims. (Cl. 219—44)

The present invention relates to infusion devices and, more particularly, to electrically heated coffee making devices and similar articles, although some of the features of the present invention are adapted to be used in infusion devices which are heated otherwise than by electricity.

One object of my invention is to produce an improved device of the class described which will efficiently extract the essence from coffee or other material.

Another object of my invention is to produce an improved coffee maker or infusion device which will not be injured if the source of heat supply remains active after the completion of the infusion operation, and which is adapted to provide hot liquid for brewing tea or other beverages in addition to the liquid used in the infusion operation.

A further object of my invention is to provide an improved device of the class described which can be easily and inexpensively produced and assembled.

Other and further objects of the invention will be obvious upon an understanding of the device about to be specifically described, or will be indicated in the appended claims, and various advantages not specifically referred to herein will occur to one skilled in the art upon employment of the invention in practice.

In order that my invention may be more clearly understood, a preferred embodiment has been chosen for purposes of illustration and description and is shown in the drawings accompanying and forming part of this specification, wherein:

Figure 1 is an elevation, partly in section, showing the structure of a coffee-making device embodying the invention;

Figure 2 is a fragmental view looking in the direction of the arrows from plane 2—2 in Figure 1, showing, in dotted lines, the siphon element, part of which is impressed in the side wall of the basket container;

Figure 3 is a section on line 3—3 of Figure 1;

Figure 4:
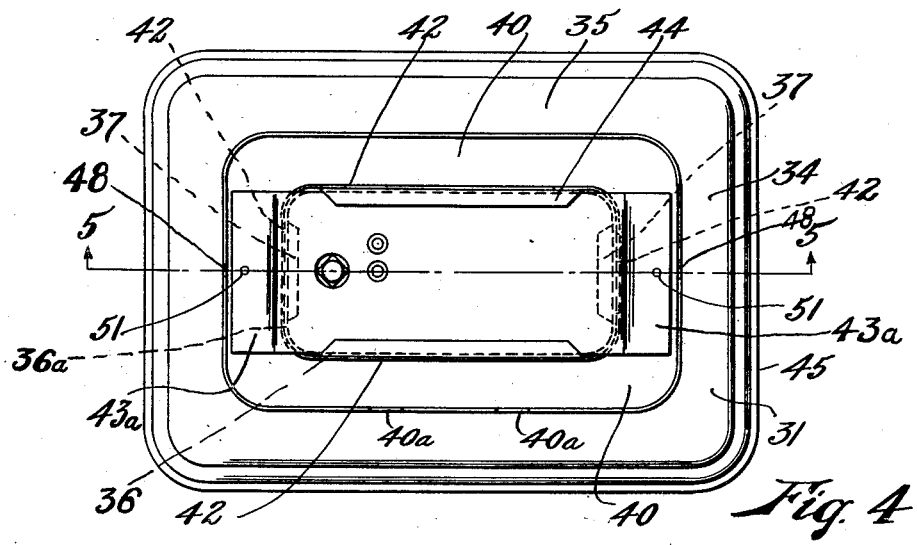
Figure 4 is a plan of the base of the device with the electrical elements omitted.

Referring to the drawings, reference character 1 represents a casing or shell which is substantially rectangular in cross-section as shown in Figures 1 and 3. This casing is preferably formed of thin sheet metal, and is open at the lower end upper ends. Two water-tight compartments or tanks 4 and 5, preferably formed of non-corrosive metal, are disposed within the casing 1. Compartments 4 and 5 are substantially rectangular in cross-section, are open at the top, and are of such dimensions as to provide an insulating air space 6 between their outer surfaces and the inner surface of casing 1.

An electric heating device 7 is mounted and sealed in the bottom of tank 4, in the usual manner, so as to prevent direct contact of the contents of said compartment with the heating element 7a. The heating element surrounds, and is in efficient thermal relation to a thermal well or cavity 8 with which the device 7 is provided and which, as is clearly shown in Figure 1 of the drawings, has a flared upper end 9 adapted to permit and facilitate the ingress of liquid from the tank 4. It will be noted that the flared end 9 is positioned a substantial distance above the bottom of tank 4, and that that part of the liquid contents thereof, which is below said end, cannot enter the well. It will thus be seen that a substantial quantity of liquid will always remain in tank 4, unless withdrawn through the spigot 10, which is connected to tank 4 contiguous the bottom thereof and extends through a lower part of the side of outer casing 1, as shown in Figure 3. The spigot 11 is in like manner connected to tank 5.

The upper end portions of tanks 4 and 5 extend substantially above the upper end of casing 1 and are adapted to be positioned by a rectangular band 12, the lower part of which is of substantially the same cross sectional area as the casing 1 and is firmly affixed to the casing 1, as by the upper screws 2 cooperating with brackets 3. The upper portion of band 12 is abruptly bent inwardly and downwardly to engage over and within the slightly flared upper end portions of the outer walls of tanks 4 and 5. A cross member 12a, which is U shaped in cross section, is preferably formed integrally with the upper portion of band 12 and extends transversely of the band substantially midway between the ends thereof so that the legs of the U are adapted to engage closely over the upper ends of the two adjacent inner vertical walls of the tanks or compartments 4 and 5. If desired, the band 12 and the cross member 12a may be firmly fixed in position to the tops of the tanks by crimping or soldering.

A plate 14 formed of light non-corrosive sheet metal, serves as a cover for the tank 4, and when in proper position is supported on the upper surfaces of the band 12 and the member 12a. A basket container or vessel 15 depends from and is preferably formed integrally with and of the same material as the plate 14. The container 15 is suspended in the upper part of the tank 5 when the plate 14 is properly positioned on tank 4. The upper edges of container 15 are turned over, as at 15a, to rest on the top of band 12. This container, in cross section, is preferably similar in shape, but slightly less in area than the tank 5 and removably mounted therein, and in intimate association with the container 15 (see Fig. 1,) is a basket 16 for holding the granulated coffee or other desired material. The basket 16 is similar in shape to, but slightly less in cross sectional area than the container 15, and is also preferably formed of light non-corrosive sheet metal and is provided with pin hole perforations or foramina 17 in the bottom thereof, the side walls 22a of the basket preferably being unperforated. A perforated cover 18 is pivotally mounted at one end on the basket, as at 19, the other end of the cover being formed with an upstanding rearwardly curved extension 20 constituting both a handle and a deflector. The bottom of the basket is provided with four struck-out feet 21, by which the basket is supported on the bottom of the container 15 with the respective side walls 22a of the basket slightly spaced from the corresponding side walls 22 of the container, and with a slight space 21a thus being provided between the bottoms of basket 16 and container 15.

The basket container or vessel 15 is arranged for the withdrawal or passage therefrom of liquid which may be received thereby from the basket 16. This may be accomplished in any of a variety of ways known in the art. However, I prefer to siphon the liquid from the vessel 15, one specific construction for this purpose being shown in Figs. 1 and 2. One of the side walls 22 of the vessel is provided with an instruck groove or passageway 23 in the shape of an inverted U having one leg slightly shorter than the other. The shorter leg of the groove 23 terminates slightly above the bottom of the vessel 15 and the wall 22 is broken away at the point of termination to provide an interior opening adjacent the bottom of the vessel, as indicated at 24, Fig. 2. The longer leg of the groove 23 extends to and intercepts the bottom of the vessel 15 which is also slightly instruck at the point of interception to provide an opening exteriorly of the vessel 15 and adjacent the side 22, as indicated at 25. The groove 23 is sealed exteriorly of the wall 22 by affixing a suitable closing device 26 to said wall over the groove, as by soldering or welding, for example, thus laterally enclosing the passageway or groove 23, one end of which opens interiorly of the vessel 15, as at 24, and the other end of which opens exteriorly of the vessel, as at 25.

It will be seen from the foregoing that upon the accumulation of a given quantity of liquid in the vessel 15 the liquid will enter the laterally closed passageway or groove 23 through the opening 24 and upon the continued accumulation the liquid will rise in the shorter leg of the passageway until it reaches the upper portion of the passageway 23. Thereupon the liquid will pass over into the longer leg and be discharged therefrom into the tank 5 through the opening 25. A siphon effect is thus produced which will continue until the level of the liquid in the vessel 15 is lowered to the height of the opening 24, which as heretofore indicated, is preferably but slightly spaced above the bottom wall of the vessel. Thus the amount of liquid trapped in the vessel 15 will be almost negligible.

A metallic member 26c is attached, as by screws 26a, to the top of plate 14; one end of said member terminating closely adjacent the container 15. This member has an opening or passageway 27 extending therethrough. A tube or pipe 28, having one end extending through an aperture 26b in plate 14 and in communication with one end of the passageway 27, is rigidly affixed to the member 26c. The tube 28 is so positioned and is of such length and size that when plate 14 and container 15 are in position, as shown in Fig. 1, the end 29 of the tube extends into the thermal well 8 to a point slightly below the flared end 9, the external diameter of the end 29 being such that there will be a slight space between the inner wall 8a of the well 8 and the exterior wall of the said end 29. No valve is provided at this point, and in order to obtain the most efficient thermosiphonic action, it is essential that the end 29 of tube 28 extend into well 8 to a point just below the flared end 9, and that the space between the inner surface of the well and the outer surface of the said end 29 be just sufficient to permit the ready ingress of the liquid contents of the tank 4 at this point.

A cover 30 is adapted to fit fairly tightly over the sides of the band 12 and is provided with an aperture 30a adapted to permit the escape of steam.

It will be obvious from the foregoing that the plate 14, tube 28, container 15 and basket 16 may be removed at will for cleansing or charging purposes, the member 26c serving as a handle to facilitate such removal. The basket 16 can, of course, be removed from container 15, when desired. The walls of tank 4 are struck in adjacent their upper ends, as shown at 16a, to prevent the container 15 from being inadvertently positioned in tank 4 instead of tank 5.

The base 31, which supports the structure above described, is preferably formed of light sheet metal and is made hollow for the reception of a protective device 32 which may be of any suitable known construction and suitable electrical connections 33, by means of which the heating device 7 may be electrically connected with a source of current supply (not shown) through a suitable plug 33a. The protective device is adapted to prevent injury, from overheating, to certain parts of the structure described.

Figure 5:
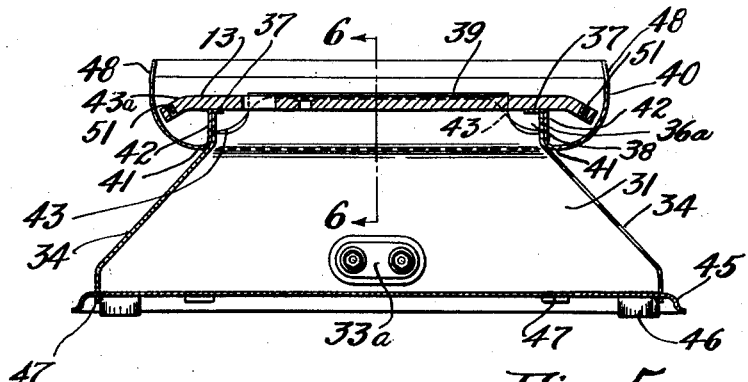
Figure 5 is a section on line 5—5 of Figure 4.
Figure 6:
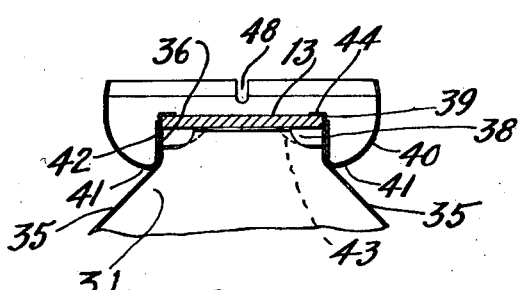
Figure 6 is a section on line 6—6 of Figure 5.

The base 31 is of the shape shown in Figures 4, 5, and 6, the end and side walls 34 and 35 thereof sloping upwardly to form a substantially truncated pyramid. From the plane of the top of such pyramid, extensions 36 and 36a of the side and end walls, rise substantially vertically for a short distance, the upper part of the extension 36a of the end walls being turned over at right angles to form the ears 37. Part of the corner portions of the vertical extensions 36 and 36a are cut away, as at 38, and the extensions 36 of the side walls extend substantially above the ears 37, as shown at 39. A member 40 of light sheet metal, has upper outer wall portion forming a substantially rectangular enclosure, as shown in Figures 4 and 5. The lower outer wall portions 41 of member 40 curve downwardly and inwardly, and then abruptly upwardly to form inner vertical wall portions 42, as shown in Figures 5 and 6. The vertical wall portions 42 are partly cut away at the corners as at 43, and such wall portions form an enclosure of such dimensions as to closely conform to the outer surfaces of the vertical extensions 36 and 36a of the base 31. The upper edges of those parts of the vertical wall portions 42 which conform to the extensions 36a, are in substantially the same plane as the upper surface of the ears 37, and the upper edges of those parts of the vertical wall portions 42 which conform to the extensions 36 are located slightly above the upper surface of ears 37, when the member 40 is positioned on the base 31 as shown in Figures 5 and 6. A thermoplate 13 is supported by the ears 37 and the upper edges of those wall portions 42 which lie in the same plane as the ears 37, and is of such dimensions that the offset end portions 43a with which the same is provided, do not quite contact with the inner surface of the member 40. The side edges of the thermoplate 13 contact with the inner surfaces of the vertical extensions 36, which project above the top surface of the thermoplate, as shown at 39 (Figure 6). Those parts of the vertical extensions 36 which project above the thermoplate, are bent over, as at 44, so as to frictionally engage said thermoplate.

From the foregoing, it will be seen that when the base 31 and the member 40 are in assembled position, as shown in the drawings, the thermoplate 13 rests on the ears 37 and the upper edges of certain of the wall portions 42, and is rigidly held in such position by the bent over portions 44. Any upward movement of member 40 is then prevented by contact of the upper edges of parts of the wall portions 42 with the plate 13, while any downward movement thereof is prevented by contact of the lower edges of the outer wall portions 41 with the sloping side and end walls of the base 31. A suitable bottom plate 45 is provided for the base 31 and is equipped with supporting feet 46. The plate 45 is removably attached to the base 31 by ears 47, formed on the base 31 and which extend through suitable slots in the plate and are bent beneath the latter. The plate 45 may also be provided with a suitable opening adapted to permit access to the safety device 32 without removing the plate from the base.

The bottom part of casing 1 is disposed over the member 40, as is clearly shown in Figure 1, so that slots 48 in the member 40 match with corresponding slots in casing 1, and the slots 40a in the member 40 engaging about the spigots 10 and 11. Bolts 50 extend in an inclined direction through the bottom part of the brackets 3 and through the slots 48 and corresponding slots in casing 1 and are threaded into openings 51 provided in the offset portions 43a of the thermoplate 13. The bolts 50 have slotted and threaded heads 52 and when tightened will pull the casing downwardly over the member 40 until the bottoms of tanks 4 and 5 firmly contact the thermoplate 13, which extends substantially entirely across the bottoms of the tanks. At the same time the tightening of these bolts force the tops of tanks 4 and 5 into firm engagement with the band 12 and the transverse member 12a. The whole structure is thus rigidly held assembled. Handles 53 formed of suitable heat insulating material, are screwed on the threaded heads 52 of bolts 50 until the end portions 54 of the handles engage the tops of the brackets 3, and are secured in position by screws 55.

The device above described is operated as follows: The cover 30 is removed by the handle 56. The tank 4 is filled with liquid, such as water, to the level of the flared end 9 of well 8. A further quantity of liquid corresponding to the amount of finished coffee or other beverage which may be desired, is then added. The plate 14 and the basket container 15 are now applied in proper position, thereby locating the end 29 of the pipe 28 in the thermal well 8, as above described. The basket 16 is charged with the desired amount of granulated coffee or other material and placed in the container 15. Current is now supplied to the heating element 7 so as to heat the liquid in the thermal well 8 and the tank 4. The small volume of water or other liquid in the well 8 will obviously heat much more rapidly than the large volume of liquid in tank 4. The sudden and rapid heating of the water in well 8 will result in the production of a thermosiphonic action, which will force the water from the well through the tube 28 and the passage 27 and discharge the same onto the cover or top 18 of the basket 16. The heated water thus discharged passes through the perforations in the cover 18 and seeps or percolates through the coffee grounds in the basket and flows through the perforated bottom of the latter into the container 15. The liquid will collect in container 15 until it rises to the level of the top of the inverted U 23, whereupon a siphoning action will occur and effect the discharge of the liquid coffee or the like from the container 15 into the tank 5.

It will be obvious, of course, that as the liquid is siphoned from the container 15, additional liquid will, of course, be continually added by thermosiphonic action through passageway 27. In this way very efficient extraction of the essence from the material contained in the basket will be obtained, as such material will be constantly bathed by hot water or other liquid in the container 15. This action will continue until the liquid level in tank 4 has been lowered to substantially the level of the flared end 9 of well 8. The water or other liquid will not be further lowered by the thermosiphonic action described, protection thus being afforded against injury to the heater elements and associated structures through excessive heating thereof. However, any or all of this remaining water or other liquid can be drawn off through spigot 10 and be utilized for brewing tea or other beverages or for other purposes.

Because of the space 21a provided between the bottoms of the basket and the container therefor, the perforations 17 are not likely to become clogged with the granules of material in the basket. However, in the event that any of the granulated material passes through the perforations 17, it is unlikely that the same will be drawn into the tank 5 because of the fact that the interior opening 24 of the siphon is spaced from the bottom of container 15.

It will also be obvious that by reason of the thermoplate 13 extending across the bottom of tank 5 and being in intimate contact therewith, the fluid in such tank will be heated and maintained heated for sometime after the heating element is rendered inactive.

As various changes may be made in the form and construction of the preferred embodiment shown and specifically described herein, without departing from the scope and spirit of the invention, all matter herein is to be interpreted as illustrative and not in a limiting sense.

Having thus described my invention, what I claim as new and desire to secure by Letters Patent, is as follows:

1. In a device of the class described, the combination of two compartments adapted to contain liquid, a heater associated with one compartment, thermosiphonic means adapted to transfer a predetermined part of the liquid contents of the said one compartment to the other compartment, said means being so positioned in respect to said one compartment as to be effective to transfer only such predetermined part of said liquid contents, means for withdrawing at will liquid remaining in the said one compartment, and means for withdrawing at will the liquid contents of the said other compartment.

2. In a device of the class described, the combination of two compartments adapted to contain liquids, a removable cover for one compartment, a basket container carried by said cover so as to be adapted to be positioned in cooperative relation to the other compartment when the cover is applied to the said one compartment, and a basket in said container, said cover, basket container and basket being adapted to be removed from and disposed in cooperative position to the compartments, as a group.

3. In a device of the class described, the combination of two compartments adapted to contain liquids, a cover for one compartment, a container carried by said cover in such relation thereto as to be disposed in cooperative relation to the other compartment when said cover is applied to the said one compartment, said cover and container being removable from and applicable to the compartments as a unitary group.

4. In a device of the class described, the combination of a plurality of compartments, heating means associated with one of said compartments, thermosiphonic means associated with said heating means whereby liquid in the said one compartment is adapted to be discharged therefrom, a cover for the said one compartment, and a member applied to said cover and having a passage-way which is in communication with said thermosiphonic means whereby liquid discharged through the latter is adapted to be directed toward another of said compartments.

5. In a device of the class described, the combination of two tanks, a heating device in one of said tanks, a cover for the said one tank, a basket container carried by said cover so as to be adapted to be associated with the other of said tanks when said cover is applied to the said one tank, a basket in said container adapted to hold material to be treated, and a member provided with a passageway applied to said cover, one end of said passageway being positioned adjacent said basket and the other end thereof being in thermosiphonic communication with said heating device whereby heated liquid is adapted to be discharged from the said one tank into said basket, said member being also adapted to serve as a handle by means of which said plate, container and basket may be removed from and applied to said tanks as a unitary group.

6. In a device of the class described, the combination of two tanks, heating means in one of said tanks, a vessel supported in the other of said tanks, means cooperative with said heating means adapted to transfer heated liquid from the said one tank to said vessel, said vessel having a substantially U shaped groove formed in a wall thereof, one leg of said groove terminating above the bottom of said vessel, and the other extending to and intercepting said bottom, and means sealing said groove in respect to the said wall of said vessel so as to form a passageway adapted to discharge liquid from said vessel to the said other tank upon the liquid in the vessel reaching a predetermined level.

7. In an infusion device, a tank, a perforated basket for material to be treated, a vessel for receiving said basket, means for supporting said vessel in communicative relation to said tank, means for discharging liquid into said vessel when the latter is supported in communicative relation to said tank, and a siphon device formed in a wall of said vessel so that one leg thereof terminates within said vessel and slightly above the bottom of said vessel and the other leg thereof terminates exteriorly of said vessel.

8. In an infusion device, a tank, a perforated basket for comminuted or granular material, a vessel for holding said basket, means for supporting said vessel in communicative relation to said tank, a wall of said vessel having a groove therein in the form of an inverted U, one leg of said groove being longer than the other and the shorter of said legs terminating above the bottom of the vessel, and means sealing said groove in respect to the wall of said vessel so that said groove and said sealing means form a passageway of substantially the same shape as said groove, the shorter leg of said passageway opening interiorly of and the longer leg thereof opening exteriorly of said vessel.

9. In an infusion device, a tank, a vessel adapted to receive a perforated basket and to be mounted in communicative relation to said tank, said vessel having a substantially inverted U shaped depression in a wall thereof, the legs of said depression being of unequal length, and means for sealing said depression in respect to the wall of said vessel so that the shorter of said legs opens interiorly of said vessel and the longer of said legs opens exteriorly of said vessel.

10. In a device of the class described, a tank, a heater in thermal association with said tank, a thermal well in thermal relation to said heater, said well having a flared end for facilitating the admission of liquid to the well from the tank, and a tube extending into said well to a point slightly below the flared end thereof, the outer diameter of said tube being substantially less than the inner diameter of said flared end and only slightly less than the inner diameter of said well.

11. In an infusion device, a heater, a well in intimate thermal relation to said heater, said well having a flared upper end portion, and a tube extending into said well to a point slightly beyond the flared end portion thereof, the outer diameter of said tube being substantially less than the inner diameter of said flared end portion but only slightly less than the inner diameter of the portion of the well adjacent said flared end portion.

12. In a device of the class described, a tank, a heater disposed in thermal relation to said tank, a second tank adjacent said first tank, and a heat storing plate formed of heat conductive material in intimate thermal relationship with said heater and with both of said tanks.

13. In a device of the class described, a plurality of tanks, a heating element associated with one of said tanks, and a plate in intimate thermal relationship with said heating element and with said tanks.

14. In a device of the class described, a casing, a plurality of tanks within said casing, an element associated with said casing and engaging the upper ends of said tanks, a hollow base having vertical upper end portions, a member engaging said vertical portions, said member also engaging said casing, a plate mounted on said base and so engaged by the said vertical portions that said plate, base and member are held rigidly assembled, brackets mounted on said casing, and means cooperating with said brackets and said plate adapted to force said member and casing into firm engagement and simultaneously, by acting through said casing and said element, to force said tanks into intimate relationship with said plate.

15. In a device of the class described, an upper assembly comprising an outer shell, a member engaging the upper portion of said shell, a tank disposed within said shell and engaged by said member, a bracket, and means securing said bracket, member and shell together; a lower assembly comprising a hollow base having sloping sides, provided with vertical extensions, an element conforming to the upper portion of said base and engaging said vertical extensions, and a plate so engaged by said vertical extensions, that said plate, base and element are rigidly held together in assembled relation, and means cooperating with said plate and said bracket to hold said upper and lower assemblies together, said holding means being operative to force said tank into firm engagement with said plate and said member.

16. In a device of the class described, an upper assembly comprising a casing, a tank disposed within said casing, a band engaging the upper portions of said casing and tank, a bracket secured to said casing and band, and a handle attached to said bracket; a lower assembly comprising a base having sloping sides provided with vertically extending portions, a member engaging said extending portions and the sloping sides adjacent thereto, a plate so engaged by said extending portions that said base, plate and member are rigidly held in assembled relation, and means cooperating with said bracket and said plate to hold said upper and lower assemblies together, said holding means being operative to force said casing into firm engagement with said member and also to force said tank into firm engagement with said band and plate.

17. In a device of the class described, in combination a foraminous basket adapted to contain a comminuted material, means for discharging a liquid into said basket in association with said material, a container adapted to hold said liquid associated with said basket, said container being so positioned in respect to said basket that said discharged liquid upon passing through said material and basket will be received by and held in said container in intimate association with said basket and material, and means for withdrawing said liquid from said container when said liquid has reached a predetermined height in said container.

18. In a device of the class described, a vessel adapted to contain a liquid, a basket which is porous in respect to a liquid and adapted to hold a comminuted material, means for slowly passing a given volume of liquid into said basket, said basket being so positioned in respect to said vessel that said liquid upon passing through said material and porous basket will pass into and will be held by said vessel in intimate association with said material, and means operative to initiate removal of said liquid from said vessel upon said liquid reaching a predetermined height in respect to said basket.

19. In an infusion device, in combination, a vessel comprising bottom and side walls and adapted to receive a liquid, said vessel having an opening through which said liquid may pass therefrom, and a foraminous container comprising bottom and side walls and adapted to hold comminuted material, said container being disposed within said vessel with the said bottom and side walls thereof respectively in intimate association with the bottom and side walls of said vessel.

20. In an infusion device, in combination, a basket comprising bottom and side walls, at least one of said walls being porous in respect to a liquid but adapted to hold finely divided material, means for introducing liquid into said basket, and a vessel adapted to receive liquid passing through said basket and comprising bottom and side walls intimately associated with said bottom and lower side walls of said basket, said vessel having an opening adjacent a bottom wall through which liquid may flow.

21. In an infusion device, in combination, a basket comprising bottom and side walls, said basket being adapted to hold a finely divided material but to permit liquid to pass therethrough, means for introducing a liquid into said basket, and a vessel adapted to receive a liquid passing through said basket and comprising bottom and side walls closely adjacent the said bottom and side walls of said basket, said vessel having an opening adjacent a side wall through which liquid may pass.

22. In an infusion device, in combination, a vessel adapted to receive a liquid, a basket adapted to permit liquid to pass therethrough but to hold comminuted material therein, means for introducing a liquid into said basket, said basket and vessel being so associated that liquid passing through the basket will be received by and accumulated in said vessel in intimate association with said basket, and means whereby liquid may be removed from said vessel upon the accumulation in the latter of a given quantity of liquid.

CHARLES A. SCHALLIS.

CERTIFICATE OF CORRECTION.

Patent No. 1,922,782.                                                    August 15, 1933.

CHARLES A. SCHALLIS.

It is hereby certified that error appears in the printed specification of the above numbered patent requiring correction as follows: Page 1, line 55, for "end" read "and"; page 2, line 9, after "shape" insert "to"; and lines 30 and 31, strike out the words "thus being provided"; page 4, line 150, claim 13, after "a" insert "heat storing"; and that the said Letters Patent should be read with these corrections there in that the same may conform to the record of the case in the Patent Office.

Signed and sealed this 26th day of September, A. D. 1933.

F. M. Hopkins (Seal)                                                    Acting Commissioner of Patents.